United States Patent Office 3,428,155
Patented Feb. 18, 1969

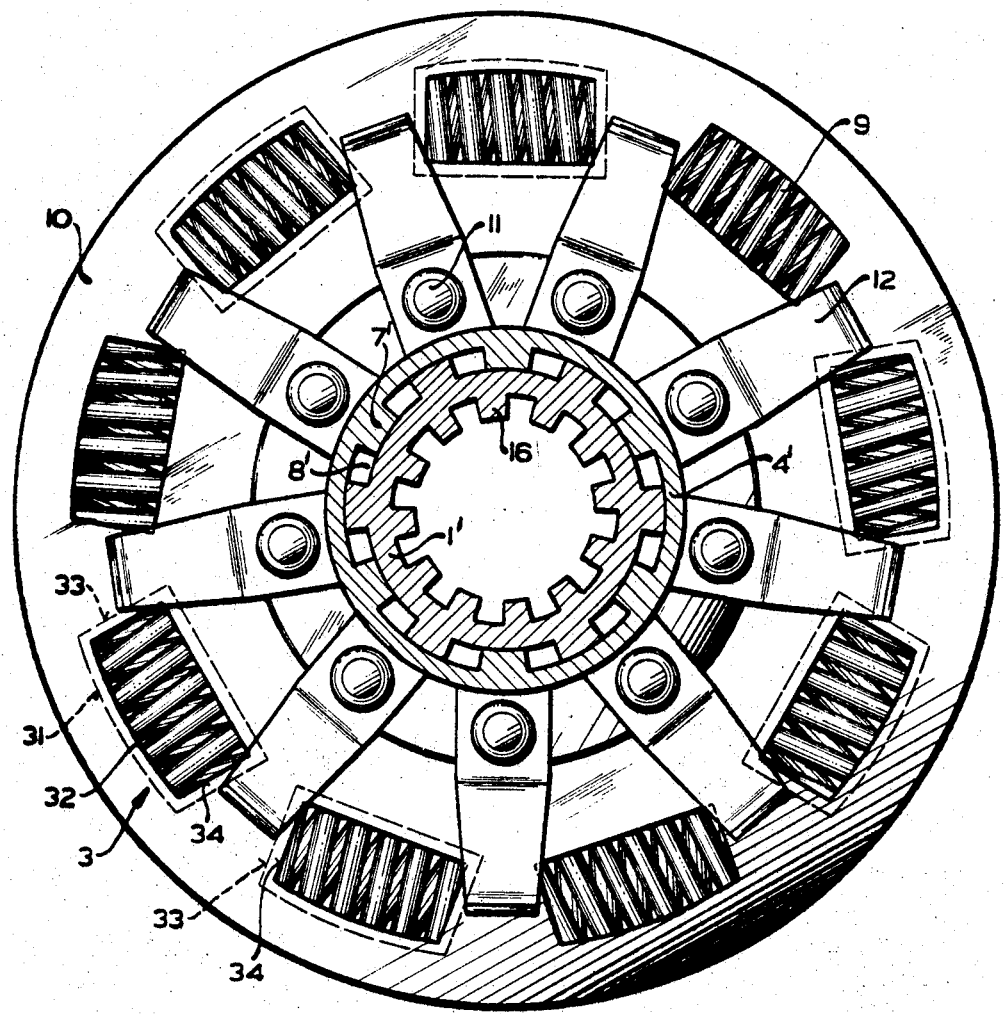

3,428,155
CLUTCH PLATE WITH VIBRATION DAMPENERS IN SERIES
Richard Binder and Kurt Faedler, Schweinfurt am Main, Germany, assignors to Fichtel & Sachs A.G., Schweinfurt am Main, Germany
Filed Nov. 21, 1966, Ser. No. 595,859
Claims priority, application Germany, Dec. 1, 1965, F 47,799
U.S. Cl. 192—106.1          7 Claims
Int. Cl. F16d 3/14, 47/02

ABSTRACT OF THE DISCLOSURE

A driven clutch member with vibration absorbing flexible center has an inner and an outer hub capable of limited angular displacement relative to each other, and a rubber ring connecting the hubs. Circumferentially distributed helical compression springs impede relative angular displacement of the outer hub and of the clutch disc carrying friction facings. The springs are stiff enough not to be significantly deformed until torsional deformation of the rubber ring is limited by abutting engagement of the two hubs.

---

This invention relates to friction clutches of the automotive type, and particularly to an improved driven clutch plate equipped with vibration dampeners.

It is known to provide the driven member of a friction clutch in a vehicle propelled by a reciprocating internal combustion engine with a flexible center to absorb torsional vibration of the crankshaft which otherwise would be transmitted to the power train. The flexible center includes steel compression springs placed between the central hub of the clutch plate and the peripheral disc which carries the friction facings. The springs permit the hub to rotate slightly relative to the disc until the springs are fully compressed and constitute abutments which prevent further relative motion. As the transmitted torque decreases, the springs expand, and the hub and disc are displaced angularly in opposite directions.

It is also known from the French Patent No. 1,389,604 to provide a clutch plate with two vibration absorbing elements arranged in series and having different elastic properties of which one is intended to absorb vibrations during normal operation of the engine while the power of the engine is transmitted to the wheels, whereas the other vibration absorbing element is intended to absorb vibrations during idling of the engine when the multiple speed transmission normally interposed between the friction clutch and the wheels disengages the engine from the wheels. The known clutch plates intended to suppress noise due to vibration during idling of the engine have not been fully satisfactory because of their bulk.

It is an object of the instant invention to provide a driven clutch plate of the type described which requires but a minimum of space, and is particularly short in an axial direction, thereby permitting installation of the new clutch plate in existing vehicles in which the space between the driving clutch plate and the transmission is limited.

With this object and others in view, as will become apparent hereinafter, the invention in one of its aspects provides an otherwise conventional driven plate of a friction clutch with two vibration dampening assemblies of which one includes a pair of annular members of rigid material, preferably metal, which constitute input and output members of the assembly respectively. The annular members are centered on the clutch axis and spaced from each other in a direction perpendicular to the circumference of one of the members, that is, either axially or radially.

A ring of elastomeric material is interposed between the annular members and has two spaced portions which are respectively fixedly fastened, as by vulcanizing, to respective faces of the annular members which are directed toward each other. The peripheral clutch disc portion of the driven clutch plate is carried by an outer hub supported on the central hub of the driven clutch plate for rotation about the clutch axis. The afore-mentioned annular members are secured against rotation about the axis relative to the outer hub member and relative to the disc or the central hub, preferably the hub.

The other vibration dampening assembly employs helical compression springs as resilient elements. The stiffness of these springs is such that angular relative displacement of the aforementioned input and output members is stopped by the associated abutments before there is significant deformation of the springs.

The exact nature of this invention as well as other objects and advantages thereof will be readily apparent from consideration of the following specification relating to the annexed drawing in which:

FIG. 4 shows the device of FIG. 3 in section on the line IV—IV.

Figure 1:
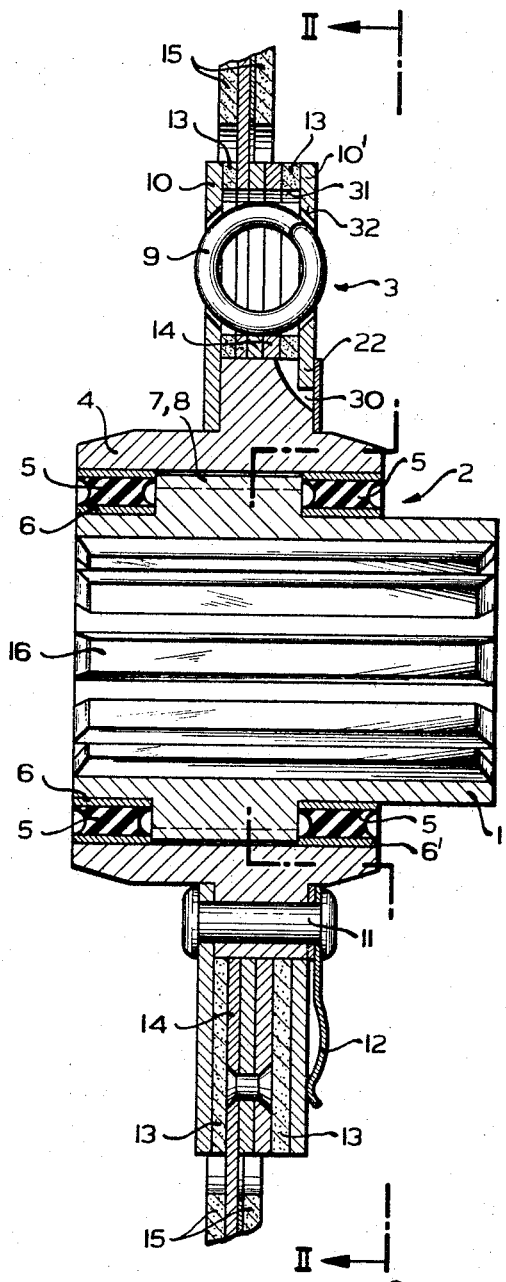
FIG. 1 shows a driven clutch plate of the invention in axial section.
Figure 2:
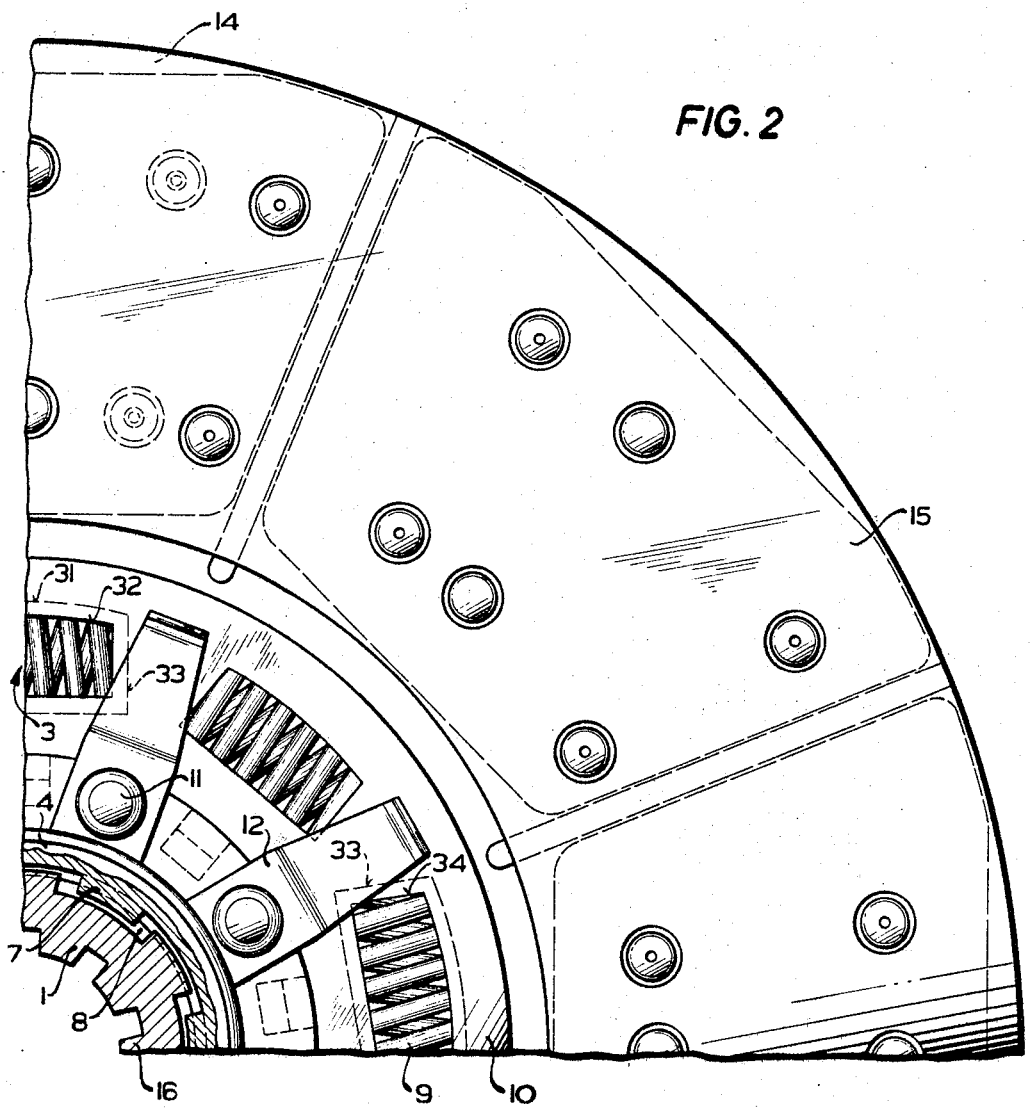
FIG. 2 shows the device of FIG. 1 in section on the line II—II.

Referring now to the drawing in detail, and initially to FIGS. 1 and 2, there is seen a driven clutch plate whose principal operating elements are a central hub 1, a clutch disc 14 whose radial faces carry friction facings 15, two vibration dampening assemblies 2, 3, and an outer hub 4 which is coaxially mounted on the central hub 1 and rotatable thereon to a limited extent.

Axial ribs 16 on the inner surface of the central hub 1 normally engage corresponding keyways in the output shaft of the clutch, not itself shown. The inner face of the outer hub 4 carries broader axial ribs 7 which define gaps circumferentially therebetween and project radially inward into corresponding gaps between ribs 8 on the outer surface of the central hub 1, while the ribs 8 on the central hub 1 extend into the gaps on the outer hub 4. The gaps are circumferentially wider than the ribs received therein so that the two hubs may be displaced through an angle of about ±13° about the clutch axis before their relative motion is stopped by abutting engagement.

The dampening assembly 2 consists of two pairs of cylindrical annular metal members 6, 6' which are centered on the clutch axis and are axially offset from the disc 14 and the ribs 7 and gaps 8 in opposite directions. The rings 6 are fixedly fastened to the outer face of the central hub 1 by a press fit, and the rings 6' are similarly fastened to the inner face of the outer hub 4. A rubber ring 5 is interposed between opposite cylindrical faces of each associated pair of annular members which are radially spaced from each other. The face portions of each rubber ring 5 which are in contact with the associated members 6, 6' are fixedly fastened to the members by vulcanizing. When the hubs 1, 4 are angularly displaced relative to each other, circumferential shear stresses are set up in the rubber rings 5, and the resulting torque increasingly opposes further angular displacement of the hubs 1, 4.

The dampening assembly 3 has an output member 10 which is a flat annular disc fixedly fastened to the outer hub 4 by pins 11 which also fasten radially elongated leaf springs 12 to the outer hub 4. The springs 12 urge a flat annular disc 10' to move axially toward the disc 10. Projections 22 on the disc 10, radially extend into associated pockets 30 of the outer hub 4 which limit the axial movement of the plates 10'.

The integral, radially innermost portion of the disc 14 constitutes the input member of the dampening assembly 3. Sheets 13 of friction facing material are axially interposed between the discs 10, 10' and the disc 14 frictionally to resist angular displacement of the discs 10, 10' and of the attached hub relative to the disc 14.

Openings 31 in the friction material sheets 13 and the disc 14 are axially aligned with corresponding openings 32 in the discs 10, 10' so that a helical compression spring 9 may be received in each set of aligned openings. The axes of the several springs 9 are approximately tangential to a common circle about the clutch axis. When the disc 14 and the plates 10, 10' are angularly displaced relative to each other, the springs 9 which are circumferentially interposed between radial abutment faces 33 in the disc 14 and corresponding faces 34 in the discs 10, 10' are compressed until their turns ultimately touch each other, and further relative motion of the disc 14 and the outer hub 4 is prevented.

As is best seen in FIG. 2 circumferentially alternating springs 9 occupy sets of aligned openings in the discs 14, 10, 10', in which all the openings are of equal size, whereas the other springs 9 are received in sets of openings in which the openings 31 in the disc 14 are circumferentially longer than the openings 32 in the discs 10, 10' so that the last-mentioned springs are offset in the direction of their axes from the associated abutment faces 33 in the inoperative position of the clutch.

The dimensions and resiliency of the rubber rings 5 are matched to the stiffness of the springs 9 in such a manner that the rings 5 are deformed in shear to the limit set by circumferential engagement of the ribs 7 and 8 before there is a significant deformation of the springs 9 in compression. The elastic characteristics of the clutch plate are thus determined solely by the resiliency of the rubber rings 5 when light loads are transmitted from the clutch disc 14 to the non-illustrated clutch shaft in the central hub 1, as during idling of the engine. When the torque applied to the clutch plate is sufficient to engage the hubs 1, 4 in circumferential abutment, the elastic characteristics of the clutch plate are determined solely by the springs 9.

During the transition from idling to normal power transmitting operation of the clutch, only those spring 9 resist angular displacement of the discs 14, 10, 10', which are located in sets of openings 31, 32 of equal circumferential length. The other springs 9 become effective only after some relative displacement of the discs 14, 10, 10'. The spring characteristic of the clutch plate thus has three portions. The first portion shows a very slow, linear increase of torque with angular displacement of the peripheral disc 14 relative to the central hub 1, corresponding to idling operation. There follows a short portion in which the torque increases somewhat more steeply with increasing displacement, and ultimately, there is a sharp increase of torque with increasing displacement to the limiting displacement value determined by full compression of springs 9.

Figure 3:
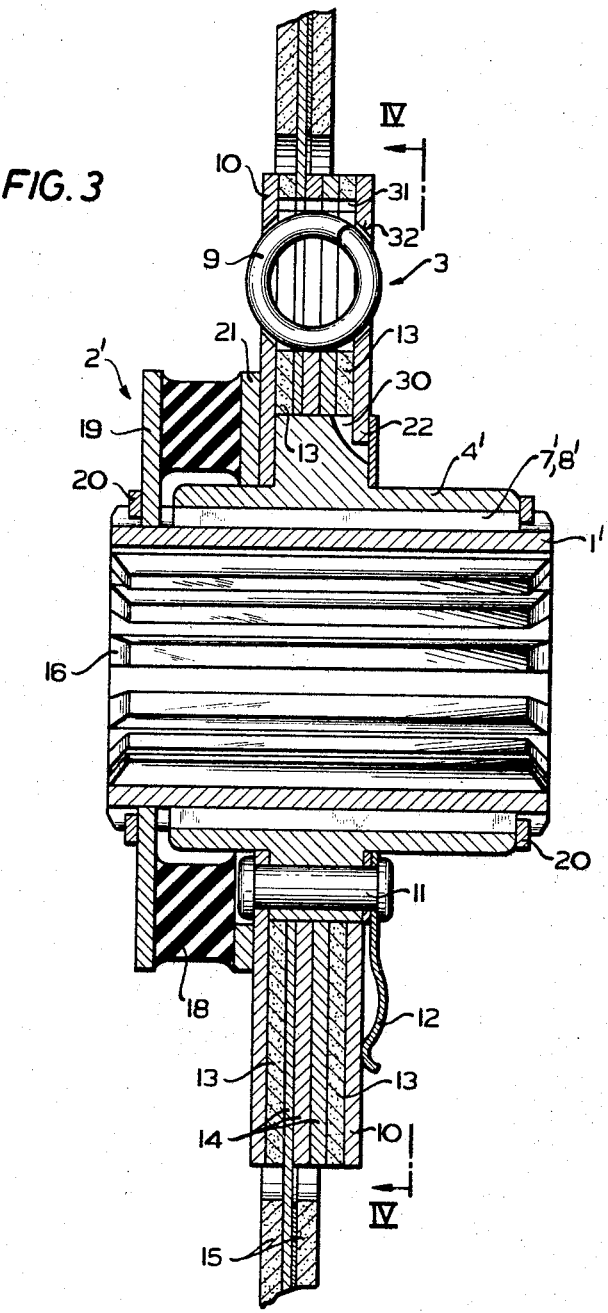
FIG. 3 shows another clutch plate of the invention in a view corresponding to that of FIG. 1.

A modified clutch plate of the invention is shown in FIGS. 3 and 4. It differs structurally from the first-described embodiment of the invention mainly by a dampening assembly 2' which connects the central hub 1' of the clutch plate to an outer hub 4', and in which a rubber ring 18 is axially interposed between radial faces of two axially spaced flat annular members 19, 21.

The central hub 1' is similar to the afore-described hub 1' and its internal ribs 16 normally engage keyways in a non illustrated clutch shaft. It rotatably supports an outer hub 4' whose inner ribs 7' cooperate with outer ribs 8' on the central hub 1 to limit relative angular displacement of the hubs in the manner described above. The ribs 8' extend over the full axial length of the central hub 1', and are engaged by mating projections which extend radially from the annular member 19 into its relatively small central opening, whereby the member 19 is secured against rotation relative to the central hub 1' in an axial position remote from the disc 14.

The annular member 21 is fastened to the outer hub 4' nearer the disc 14 by a pressure fit, the hub 4' being partly received in the relatively large central opening of the member 21. The rubber ring 18 is vulcanized to the spacedly opposite radial faces of the members 19, 21. The dampening assembly 2' and the outer hub 4' are secured against axial displacement on the hub 1' by retaining rings 20 which project from annular grooves in the central hub.

The hub 4' carries the other dampening assembly 3, a clutch disc 14 and associated elements which are identical with the corresponding structure described above with reference to FIGS. 1 and 2. The clutch plate shown in FIGS. 3 and 4 operates as described above.

While natural rubber is the preferred resilient material for use in the dampening assemblies 2, 2' because of its mechanical properties, oil resistant grades of synthetic rubber or other elastomeric materials may be employed where operating conditions so require.

It is a common feature of the afore-described clutch plates that their axial length is relatively small. Although two or even three vibration absorbing elements are provided, the axial length of the disclosed plates is not greater than that of conventional plates commonly employed for transmitting torques of equal magnitude. The dampening effect provided by the viscous rubber rings 5, 18 is sufficient to permit friction elements, such as the sheets 13, to be omitted from the assemblies 2, 2'. The relatively small bulk of the clutch plates of the invention is also due to the fact that the vibration dampening assemblies 2, 3 or 2', 3 are radially offset, the assembly 2 or 2' being arranged in a space which fits entirely or almost entirely into the center of the associated annular assembly 3.

The annular input and output members of the dampening assemblies 2, 2' may be attached to the associated hubs 1, 1' or 4, 4' by a simple press fit, thereby avoiding bulky fasteners.

When two, practically identical vibration dampening assemblies 2, in which the input and output members are radially spaced, are offset axially from the disc 14 in a symmetrical manner, as shown in FIG. 1, the individual assemblies 2 can be made relatively small, and contribute very little, if anything, to the radial dimensions of the clutch plate. They also provide an even distribution of stresses over the several elements of the clutch plate, and axially seal the engaged ribs 7, 8 against loss of lubricant grease, not explicitly shown in the drawing, but essential to continuous successful operation of the clutch.

As set forth in the commonly owned, copending application Ser. No. 594,855, filed on Nov. 16, 1966, in which one of us is a coinventor, the angular displacement of the outer hubs 4, 4' relative to the central hubs 1, 1' must be limited to ±14°, and the dimensions of the ribs 7, 8 (7', 8') and of the intervening gaps must be selected accordingly.

It should be understood, of course, that the foregoing disclosure relates only to preferred embodiments of the invention, and that it is intended to cover all changes and modifications of the example of the invention herein chosen for the purpose of the disclosure which do not constitute departures from the spirit and scope of the invention set forth in the appended claims.

What is claimed is:

1. In a clutch plate for a friction clutch having a central hub portion, said hub portion having an axis, a peripheral annular clutch disc portion extending about said axis and carrying a friction facing, two vibration dampening assemblies interposed in series between said portions for transmitting torque between the same when the disc portion is being rotated about said axis, each assembly having an input member, an output member rotatable relative to said input member about said axis, resilient means interposed between said input and output members for resisting relative angular displacement of said input and output members with a torque which increases with increasing displacement, and abutment means for limiting the angular relative displacement of said input and output members, the improvement which comprises:

(a) a pair of annular members of rigid material respectively constituting input and output members of one of said assemblies;
   (1) said annular members being centered in said axis, spaced from each other in a direction transverse to the circumference of one of said members, and having respective faces directed toward each other;
(b) the resilient means of said one assembly including a ring of elastomeric material interposed between said annular members and having two spaced face portions respectively fixedly fastened to said faces of the annular members;
(c) an outer hub member supported on said hub portion for rotation about said axis, said hub member carrying said clutch disc portion; and
(d) fastening means securing said annular members against rotation about said axis relative to said hub member and to one of said portions respectively,
   (1) the resilient means of the other vibration dampening assembly including a plurality of helical compression springs,
   (2) the stiffness of said springs being such that angular relative displacement of the input and output members of said one dampening assembly is stopped by the associated abutment means before there is significant deformation of said springs.

2. In a driven member as set forth in claim 1, said annular members being axially spaced from each other, one of said annular members being axially remote from said disc portion and the other annular member being axially adjacent said disc portion, said remote annular member having a central opening and projections extending radially inward of said opening, said hub portion being formed with external recesses extending radially inward in said hub portion and respectively receiving said projections for securing said remote annular member against rotation relative to said hub portion, said adjacent annular member having a central opening larger than the central opening of said remote member, said hub member being partly received in said opening of the adjacent annular member, said abutment means for limiting relative angular displacement of said annular members including stop means on said hub portion and said hub member engageable for limiting rotation of said hub member relative to said hub portion.

3. In a driven member as set forth in claim 1, said annular members being radially spaced from each other, said ring of elastomeric material being radially interposed between said annular mmbers, the radially inner one of said annular members being fastened to said hub portion, the radially outer annular member being fastened to said hub member, and said abutment means for limiting relative displacement of said annular members including stop means on said hub portion and said hub member abuttingly engageable for limiting rotation of said hub member relative to said hub portion.

4. In a driven member as set forth in claim 3, said hub portion having a face extending about said axis and directed in a radially outward direction, and said hub member having a face extending about said axis and directed toward said face of the hub portion in a radially inward direction, said stop means including a plurality of circumferentially spaced, radial projections on each of said faces of the hub portion and of the hub member, adjacent projections on each face defining gaps therebetween, the projections of each face being received in the gaps defined by the projections of the other face, the circumferential dimension of each gap being greater than the corresponding dimension of the projection received therein.

5. In a driven member as set forth in claim 1, said one assembly further comprising another pair of annular members of rigid material centered in said axis, and spaced from each other in a direction transverse to the circumference of one member of said other pair, another ring of elastomeric material interposed between the members of said other pair and fixedly fastened to the same, and fastening means securing said annular members against rotation about said axis relative to said hub member and said one portion respectively, said pairs of annular members and said elastomeric rings interposed therebetween being axially offset from said disc portion in opposite axial directions.

6. In a driven member as set forth in claim 1, said helical springs having respective axes approximately tangential to a common circle about said axis, said one vibration dampening assembly being spaced from said circle in a radially inward direction.

7. In a driven member as set forth in claim 6, said one vibration dampening assembly being spaced in a radially inward direction from each of said helical springs, said other vibration dampening assembly being annular about said axis, and a portion of said one vibration dampening assembly being received in said other assembly.

References Cited

UNITED STATES PATENTS

| | | | |
|---|---|---|---|
| 2,065,601 | 12/1936 | Meyer | 192—68 |
| 3,101,600 | 8/1963 | Stromberg | 192—68 |
| 3,280,949 | 10/1966 | Ross | 192—68 |

FOREIGN PATENTS

| | | |
|---|---|---|
| 1,377,143 | 9/1964 | France. |

BENJAMIN W. WYCHE III, Primary Examiner.

U.S. Cl. X.R.

192—106.2; 64—27